E. A. COLLIN.
WINDMILL.
APPLICATION FILED AUG. 9, 1910.
1,005,602.
Patented Oct. 10, 1911.
2 SHEETS—SHEET 2.
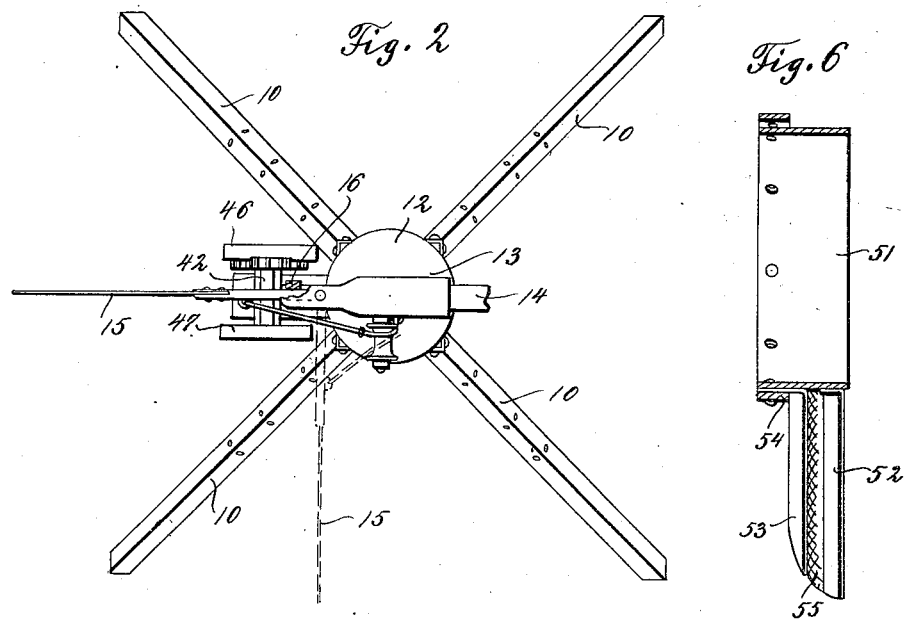
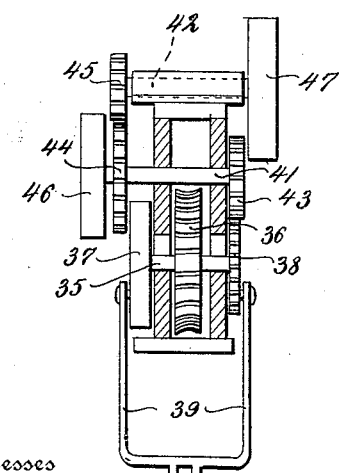
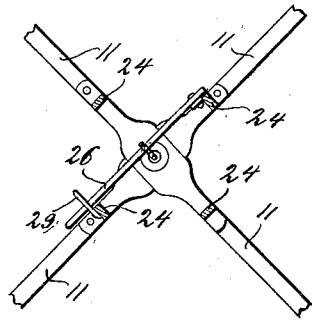

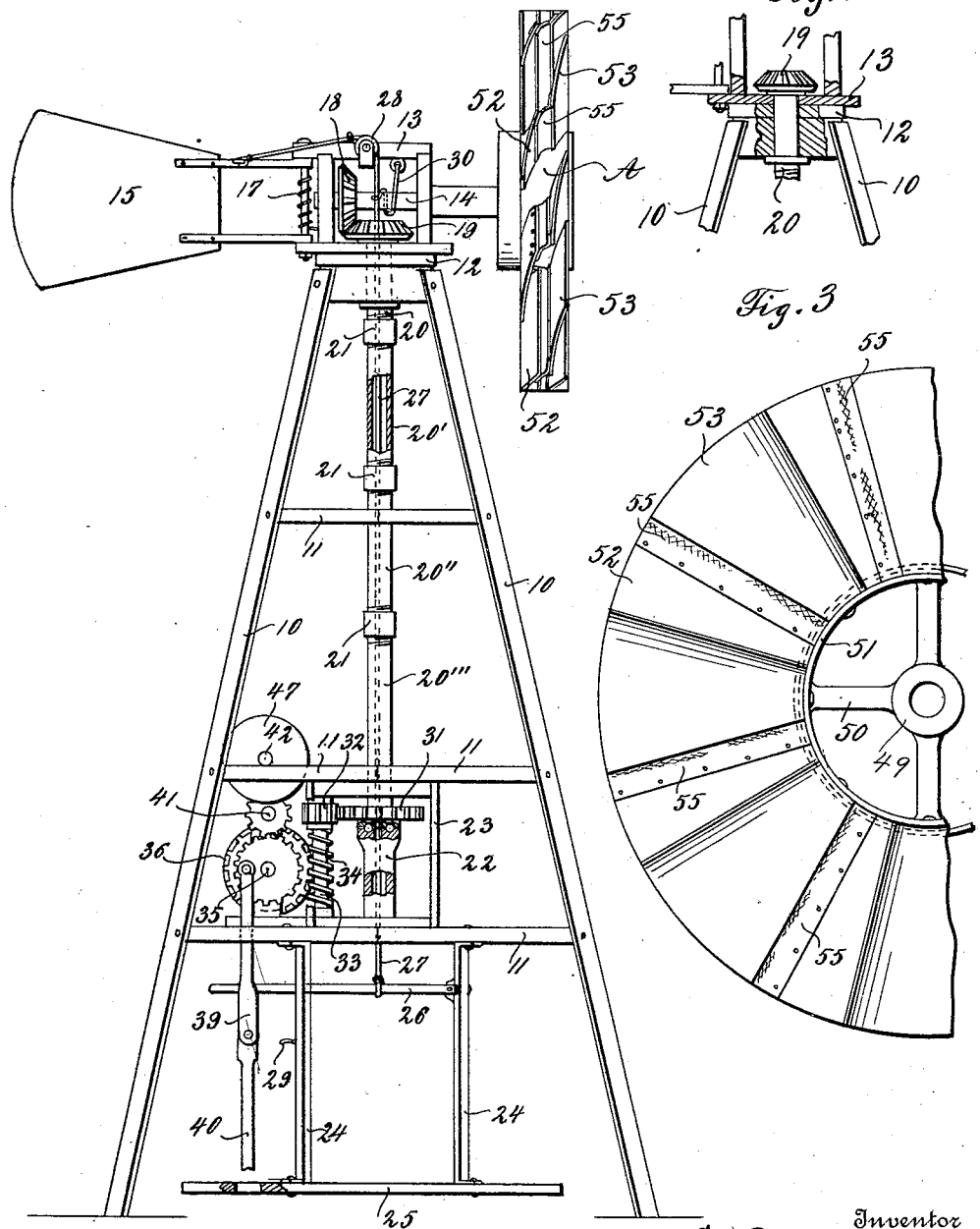

UNITED STATES PATENT OFFICE.

ERIK A. COLLIN, OF STORY, NEBRASKA.

WINDMILL.

1,005,602.  Specification of Letters Patent.  Patented Oct. 10, 1911.

Application filed August 9, 1910. Serial No. 576,332.

*To all whom it may concern:*

Be it known that I, ERIK A. COLLIN, a citizen of the United States, residing at Story, in the county of Sioux and State of Nebraska, have invented certain new and useful Improvements in Windmills, of which the following is a specification.

This invention relates to windmills, and is designed to construct a windmill which will be simple, automatic, and durable in its construction and which will increase efficiency of devices of this nature heretofore used.

With the above and other objects in view, this invention consists in the construction, combination, and arrangement of parts, all as hereinafter more fully described, claimed, and illustrated in the accompanying drawings, wherein—

Figure 1 is a side elevation partly in section of a windmill constructed in accordance with the present invention; Fig. 2 is a top plan view thereof; Fig. 3 is a fragmentary elevation of the wind wheel; Fig. 4 is an outside elevation of the driving mechanism; Fig. 5 is a bottom plan view of the tail and brake operating lever; Fig. 6 is a fragmentary cross section of the wind wheel; Fig. 7 is a detail sectional view showing more clearly the mounting of the wind wheel supporting frame at the top the mill.

Reference being had to the accompanying drawings, 10 indicates a series of vertical converging supports having interposed therebetween at various intervals a series of transverse supports 11. A platform 12 is carried at the upper extremity of the supports 10 and has rotatably mounted thereon a frame 13 in which is rotatably mounted the shaft 14. At the outer terminal of the shaft 14 is rigidly mounted the wind wheel A as hereinafter more fully described. A tail 15 is mounted on the opposite terminal of the frame 13 and is adapted to bear against an upright 16 carried by the frame through the instrumentality of the spring 17 when said tail is operated to swing the frame so that the wind operates against the face of the wind wheel A.

A beveled gear 18 is mounted on the shaft 14 adjacent to one terminal thereof and meshes with the beveled gear 19 rigidly carried by a section of tubing 20 which forms the pivotal axis for the frame 13. This section of tubing 20 is connected to a series of sections 20′, 20″, and 20‴, said sections being connected by a series of threaded collars 21 and consequently forming a tubular shaft. The lower extremity of the tubular shaft rests on a tubular section 22 and is provided with a ball bearing connection said tubular section resting in a casing 23 carried by the lower cross bars 11.

The lower cross braces 11 carry a series of downwardly extending supports 24 which carry the floor 25 at their lower terminals. A lever 26 is pivoted to one of the supports 24 and has a cable 27 connected thereto which extends upwardly through the tubular shaft and over a pulley 28 carried by the upper side of the frame 13, said cable being secured at the terminal thereof to the frame carrying the tail. When the lever 26 is pulled down the tail is swung inwardly thereby causing the wind wheel to remain inactive, said lever being retained in a lowered position by the hook 29 carried by one of the supports 24. The movement of the cable 27 operates a flexible strap 30 encircling the shaft 14 which acts as a brake. This strap 30 is secured at one terminal thereof to the upper side of the frame 13 and is at the opposite terminal thereof attached to the cable 27 after said strap has been passed about the shaft 14.

The lower end of the tubular shaft is provided with a gear 31 which is contained within the casing 23, said gear meshing with a similar gear 32 carried by the shaft 33 said shaft being provided with a worm 34. The shaft 35 is mounted adjacent to the worm 34 and carries a centrally disposed wormed gear 36 which meshes with the worm 34, thus upon the rotation of the shaft 14 the gear 36 will likewise rotate. A disk 37 is mounted at one terminal of the shaft 35 while a spur gear 38 is rotatably mounted on the opposite extremity of the shaft 35. This disk and the spur gear have centrally mounted thereon the yoke 39 which is pivotally connected to the pump rod 40. Thus it will be seen that upon the rotation of the gear 36 the pump rod will be oscillated vertically. A pair of counter-shafts 41 and 42 are located above the shaft 35. The shaft 41 is driven by a spur gear meshing with the spur gear 38 of the shaft 35, while the shaft 42 is driven by the gears 44 and 45 carried by the shafts 41 and 42 respectively. The shafts 41 and 42 are provided with the pulleys 46 and 47 respectively which provide a means whereby various small machines may be operated.

The wind wheel is constructed with a hub 49 to the spokes 50 of which is secured a band 51. A series of inner paddles 52 are secured to the band 51. A plurality of outer paddles 53 are connected to the band 51 by the auxiliary band 54. Each outer paddle 53 is connected to the corresponding inner paddle 52 by a strip of canvas 55.

Having thus described my invention, what is claimed as new is:—

In a wind mill, the combination of a main supporting frame, pumping mechanism mounted therein, a wheel shaft supporting frame carried by the main supporting frame, a shaft mounted on said wheel shaft supporting frame, a driving member connected to the pumping mechanism and operable by said shaft, a wind wheel mounted on the shaft, a tail carried by the wheel shaft supporting frame, a flexible operating cable extending from the base of the main frame to the tail, a pulley arranged above said shaft and having the operating cable passing thereover, a brake band connected at one end to the upper end of the wheel shaft frame and passing around said shaft and connected to the operating cable, and a lever for actuating the operating cable to throw the tail out of the wind and simultaneously exert a pull on the brake band to tighten the latter on the wheel shaft.

In testimony whereof I affix my signature in presence of two witnesses.

ERIK A. COLLIN.

Witnesses:
W. H. DAVIS,
THEO. OHERBLAD.

---

Copies of this patent may be obtained for five cents each, by addressing the "Commissioner of Patents, Washington, D. C."